(12) United States Patent
Seever

(10) Patent No.: US 8,937,449 B2
(45) Date of Patent: Jan. 20, 2015

(54) APPARATUS AND METHOD FOR EFFICIENTLY POWERING A ONE-PHASE MOTOR

(76) Inventor: Larry G. Seever, Sarona, WI (US)

( * ) Notice: Subject to any disclaimer, the term of this patent is extended or adjusted under 35 U.S.C. 154(b) by 211 days.

(21) Appl. No.: 13/584,576

(22) Filed: Aug. 13, 2012

(65) Prior Publication Data

US 2014/0042954 A1 Feb. 13, 2014

(51) Int. Cl.
*H02P 1/26* (2006.01)
*H02P 23/02* (2006.01)
*H02P 25/04* (2006.01)

(52) U.S. Cl.
CPC ............... *H02P 23/02* (2013.01); *H02P 25/04* (2013.01)
USPC .......................... 318/767; 318/759; 318/758

(58) Field of Classification Search
USPC ......... 318/767, 759, 758, 760, 805, 772, 807, 318/809, 245; 363/138
See application file for complete search history.

(56) References Cited

U.S. PATENT DOCUMENTS 5,990,639 A * 11/1999 Arai et al. ...................... 318/245
6,208,113 B1 * 3/2001 Lelkes et al. .................. 318/807
6,320,775 B1 * 11/2001 Ito et al. ......................... 363/132

* cited by examiner

*Primary Examiner* — Karen Masih
(74) *Attorney, Agent, or Firm* — Clifford Kraft

(57) ABSTRACT

An apparatus and method for drastically increasing the efficiency of a single phase AC motor. A DC solid state driver is used to pulse a combination of the motor coil and a series capacitor. The coil/capacitor combination allows the motor to run near resonance (or a multiple of resonance). This results in a flywheel effect that only requires pulses at the proper time to keep it going. The solid state driver is powered by pulsed DC at around 150 volts peak and clocked at 60 Hz by a square wave timing circuit.

15 Claims, 2 Drawing Sheets

APPARATUS AND METHOD FOR EFFICIENTLY POWERING A ONE-PHASE MOTOR

FIELD OF THE INVENTION

The present invention relates to powering AC motors and more particularly to an apparatus and method for more efficiently powering a single-phase AC motor.

DESCRIPTION OF THE PRIOR ART

In U.S. Pat. No. 8,080,970, a way to power a 3-phase AC motor from a battery for use in a motor vehicle was described. The present application shows that the efficiency of a single phase AC motor can also be tremendously enhanced.

Typically, a single phase AC motor is simply powered directly from the 120 volt, or equivalent, power line. Other than starting concerns, these motors run continuously be forming magnetic fields in their coils that cause the rotor to continue to rotate. However, these motors are notoriously inefficient. For example, ¼ HP AC motor may use 600 watts of power from the AC line. Since 1 HP is 745.699 watts, ¼ HP is only 186.42 watts. A ¼ HP motor drawing 600 watts is only running at 31% efficiency.

It would be advantageous to have a system where a single phase AC motor could be run from the AC line with tremendously increased efficiency.

SUMMARY OF THE INVENTION

The present invention relates to an apparatus and method for drastically increasing the efficiency of a single phase AC motor. A DC solid state driver is used to pulse a combination of the motor coil and a series capacitor. The coil/capacitor combination allows the motor to run near resonance (or a multiple of resonance). This results in a flywheel effect that only requires pulses at the proper time to keep it going. The same motor that originally drew 600 watts may only draw on the order of 300-350 watts.

The solid state driver is powered by pulsed DC at around 150 volts peak and clocked at 60 Hz by a square wave timing circuit.

DESCRIPTION OF THE FIGURES

Attention is now directed at several drawings that illustrate features of the present invention.

Several drawings and illustrations have been presented to aid in understanding the present invention. The scope of the present invention is not limited to what is shown in the figures.

DETAILED DESCRIPTION

Embodiments of the present invention provide a way to tremendously increase the efficiency of single phase AC motors.

Figure 1:
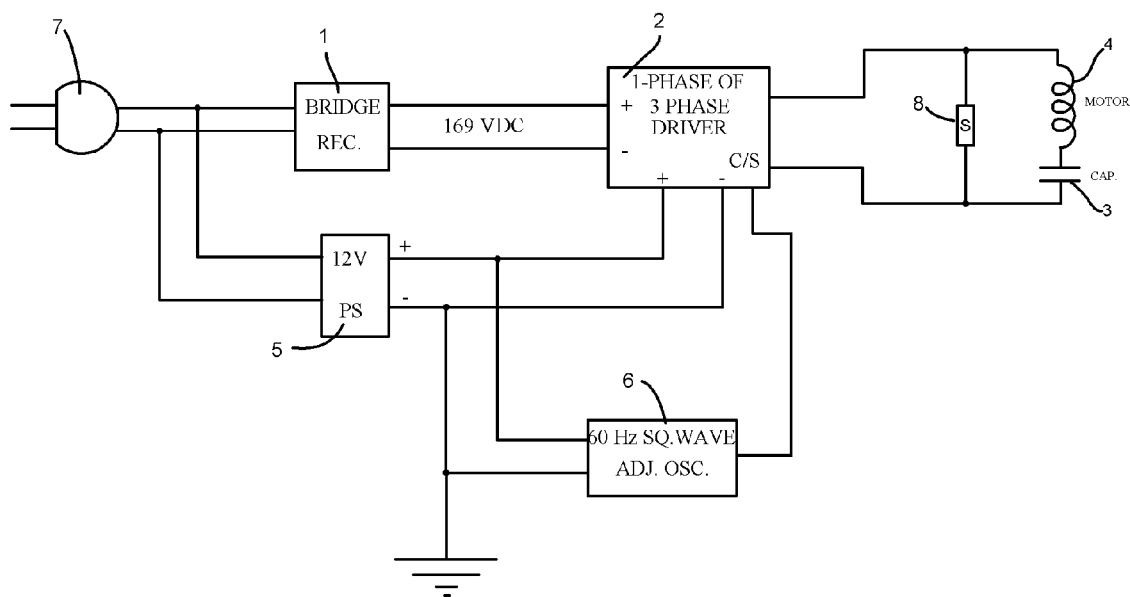
FIG. 1 shows a block diagram of an embodiment of the present invention.

Turning to FIG. 1, an embodiment of the present invention is shown. A full-wave bridge rectifier 1 is powered from the AC power line 7 into a filter capacitor. The result is a slightly smoothed, pulsed DC output of around 169 volts. This voltage is fed into one phase of a solid-state driver switch 2, similar to those used to drive 3-phase motors. The solid state switch 2 is turned on and off by a 60 Hz timing circuit 6. A small 12 volt power supply 5 is used to supply control voltages and to power the timing circuit 6. The output of the solid state switch 2 is shunted with a surge suppressor 8 and feeds the motor winding 4 through a series capacitor 8. The motor operates in a resonant mode.

Figure 2:
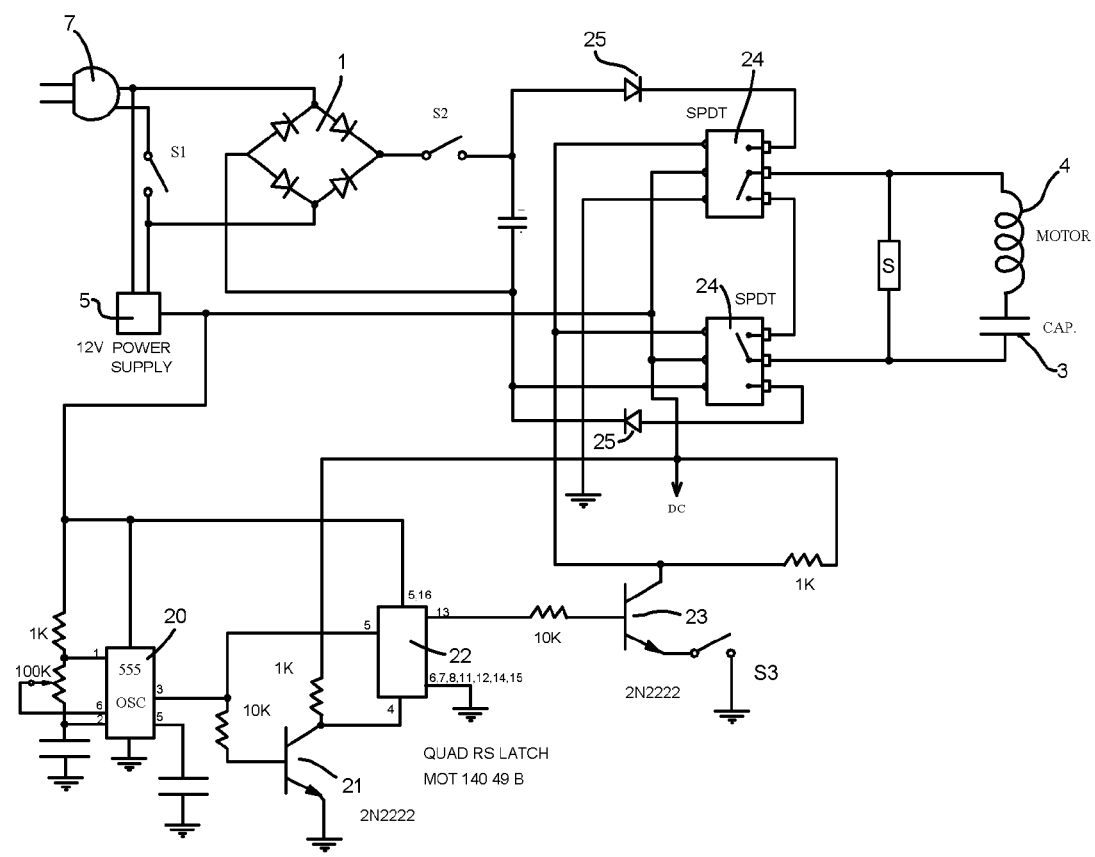
FIG. 2 shows a schematic diagram of the embodiment of FIG. 1.

FIG. 2 shows a schematic diagram of the embodiment of FIG. 1. The power line 7 drives a full-wave rectifier 1, preferably a bridge rectifier, and a 12 volt DC power supply 5. The 12 volts from the DC power supply 5 powers a timing circuit and biases a SPDT solid state switch 24 or switching module. Both positive and negative outputs from the bridge rectifier 1 are switched in the two sections of the solid state switch 24. The pulsed DC voltage is fed into the through a pair of diodes 25 (in a positive and negative configuration) that prevent any back current from entering the switch 24. The switch 24 is also shunted by a surge protector 8 for further protection and drives the motor winding 4 and the series capacitor 3.

Timing is supplied by a 555 timer 20 well-known in the art. This timer drives an inverter transistor 21. Both the inverted and non-inverted signals from the 555 timer 20 are fed into a quad RS Latch 22 such as a MC14049B known in the art. The inverter transistor 21 can be similar to a 2N2222. The output of the quad latch 22 is fed through an inverting buffer 23 where it then is used to drive time the solid state switches 24.

The motor coil 4 and the series capacitor 3 are run in a resonant mode. Near resonance, there is a voltage gain in this combination of around Q times the voltage, where Q is the quality factor of the combination (known in the art to be $X_L/R$). This leads to a tremendous increase in efficiency.

Tests were run on two motors:
TEST 1 Small Fan Motor
AC Amps in direct connection: 500 mA
AC Amps using invention: 220 mA
AC Amps at motor coil with invention: 500 mA
Power in direct connection: 60 watts.
Power using invention: 26.4 watts.
TEST 2 ¼ HP Split-Phase Induction Motor
AC Amps in direct connection: 5 Amps
AC Amps using invention: 2.8 Amps
AC Amps at motor coil with invention: 5 Amps
Power in direct connection: 600 watts
Power using invention: 336 watts.

The present invention allows a single phase AC motor to run on 120 volts AC, but with a converter module and series capacitor. The benefit is a 30-60% reduction in power. The converter module converts the 120 VAC sine wave into a DC current through the motor winding that charges the capacitor. At exactly the correct time, the solid state switch reverses the current discharging the capacitor through the motor winding. The capacitor/winding combination results in a resonance effect.

It should be noted that the series capacitor and winding do not have to be exactly at resonance. However, the capacitor should be chosen to resonate with the winding at approximately 60 Hz or a multiple or sub-multiple of 60 Hz.

Several descriptions and illustrations have been provided to aid in understanding the present invention. One with skill in the art will realize that numerous changes and variations may be made without departing from the spirit of the invention. Each of these changes and variations is within the scope of the present invention.

I claim:

1. An apparatus for increasing the efficiency of a single phase AC motor comprising:
   a full-wave rectifier adapted to convert AC line voltage to pulsating direct current;

a solid state switch adapted to drive a single phase AC motor winding through a series capacitor, said solid state switch driven by said pulsating direct current;

said solid state switch switched at approximately 60 Hz, said solid state switch reversing current flow direction through said winding on each one-half cycle;

a timing circuit electrically coupled to said solid state switch and causing said solid state switch to switch periodically.

2. The apparatus of claim 1 wherein said series capacitor and winding are at resonance at approximately 60 Hz.

3. The apparatus of claim 1 wherein said full-wave rectifier is a bridge rectifier.

4. The apparatus of claim 1 wherein said full-wave rectifier feeds the solid state switch with positive and negative series diodes.

5. The apparatus of claim 1 wherein said timing circuit includes a square wave oscillator and a latch.

6. The apparatus of claim 1 wherein said solid state switch is a SPDT solid state switching module.

7. The apparatus of claim 2 further comprising a timing circuit electrically coupled to said solid state switch and causing said solid state switch to switch periodically.

8. The apparatus of claim 7 wherein said full-wave rectifier is a bridge rectifier.

9. The apparatus of claim 8 wherein said full-wave rectifier feeds the solid state switch with positive and negative series diodes.

10. The apparatus of claim 9 wherein said timing circuit includes a square wave oscillator and a latch.

11. The apparatus of claim 10 wherein said solid state switch is a SPDT solid state switching module.

12. A circuit for increasing the efficiency of a single phase AC motor comprising a full wave bridge rectifier power by line power driving a SPDP solid state switch through a pair of diodes, the solid state switch, in turn, driving a motor winding through a series capacitor, the solid state switch being caused to change polarity of DC current being supplied to the motor winding on each half cycle of 60 Hz;

an oscillator driving a latch to provide half cycle timing to the solid state switch.

13. The circuit of claim 12 wherein the oscillator is a square wave oscillator.

14. The circuit of claim 12 further comprising a filter capacitor coupled across the output of said bridge rectifier.

15. The circuit of claim 13 further comprising a filter capacitor coupled across the output of said bridge rectifier.

* * * * *